US012170690B2

(12) United States Patent
St. Pierre

(10) Patent No.: US 12,170,690 B2
(45) Date of Patent: Dec. 17, 2024

(54) FORMULATING RESPONSES FOR SLOWING REQUESTS FROM MALICIOUS DOMAIN NAME SYSTEM (DNS) CLIENTS

(71) Applicant: Arbor Networks, Inc., Westford, MA (US)

(72) Inventor: Brian St. Pierre, Acworth, NH (US)

(73) Assignee: ARBOR NETWORKS, INC., Westford, MA (US)

( * ) Notice: Subject to any disclaimer, the term of this patent is extended or adjusted under 35 U.S.C. 154(b) by 301 days.

(21) Appl. No.: 17/807,642

(22) Filed: Jun. 17, 2022

(65) Prior Publication Data

US 2023/0231870 A1 Jul. 20, 2023

Related U.S. Application Data

(60) Provisional application No. 63/300,884, filed on Jan. 19, 2022.

(51) Int. Cl.
*H04L 9/40* (2022.01)
*H04L 61/4511* (2022.01)
*H04L 67/145* (2022.01)

(52) U.S. Cl.
CPC ...... *H04L 63/1458* (2013.01); *H04L 61/4511* (2022.05); *H04L 63/1416* (2013.01); *H04L 63/1425* (2013.01); *H04L 63/1441* (2013.01); *H04L 67/145* (2013.01)

(58) Field of Classification Search
CPC ............. H04L 63/1458; H04L 61/4511; H04L 63/1416; H04L 63/1425; H04L 63/1441; H04L 67/145; H04L 2463/141; H04L 2463/142; H04L 2463/144
See application file for complete search history.

(56) References Cited

U.S. PATENT DOCUMENTS 8,613,089 B1 * 12/2013 Holloway ........... H04L 63/1458
709/227
2018/0302438 A1 * 10/2018 Robertson ............... H04L 63/20
2020/0137021 A1 * 4/2020 Janakiraman ........... H04L 63/10

* cited by examiner

*Primary Examiner* — Bruce S Ashley
(74) *Attorney, Agent, or Firm* — Foley & Lardner LLP

(57) ABSTRACT

A method of delaying computer network clients from sending DNS queries. The method includes receiving a DNS query from a client and consulting a client record in a client record database and/or a flow record in a flow record database storing information about the flow including about one or more previous DNS queries and/or responses in the flow. The method further includes formulating a response to the DNS query as a function of the information about the client and/or the information about the flow, updating the client record with information about the client and/or the flow record with information about the DNS query and the response as formulated, and transmitting the response as formulated to the client. The DNS query includes a question and the response is intentionally defective or incomplete and causes the client to be delayed in sending another DNS query as part of an attack.

16 Claims, 8 Drawing Sheets

Timer-Based Queue Processing

FORMULATING RESPONSES FOR SLOWING REQUESTS FROM MALICIOUS DOMAIN NAME SYSTEM (DNS) CLIENTS

CROSS REFERENCE TO RELATED APPLICATIONS

This application claims priority to U.S. Patent Application Ser. No. 63/300,884 filed Jan. 19, 2022, which is incorporated herein by reference in its entirety.

BACKGROUND

1. Field of the Disclosure

The present disclosure relates to network security, and more particularly, to a system and method for formulating responses for slowing requests from malicious domain name system (DNS) clients.

2. Description of Related Art

Application layer distributed denial of service (DDoS) attacks (also referred to as application attacks) utilize valid requests, often from non-spoofed IP addresses to attack an application itself, focusing on specific vulnerabilities or issues of the application. The requests are designed to consume resources on the target system, making it so that the target system becomes degraded or unusable by legitimate users. Once detected, an attack can be mitigated by preventing packets from an attack to its target by dropping the packets. However, this technique may signal the attacker that the attack has been detected and is no longer working, causing the attacker to either change the attack technique, use a different source address, or otherwise avoid dropping of the packets from the attack. A more naive attacker may simply continue to resend requests that were dropped, thus consuming bandwidth of a device performing the mitigation.

Application attacks need to be performed by intelligent devices that have the ability to conform to a protocol of an application being attacked, which can include conforming to protocol handshakes and protocol/application compliance. With the proliferation of insecure internet-of-things (IoT) devices in recent years that have such capabilities, there is risk of an increase in application attacks.

While conventional methods and systems have generally been considered satisfactory for their intended purpose, there is still a need in the art for a method of thwarting application attacks without alerting the attacker.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of delaying computer network clients from sending DNS queries. The method includes receiving a DNS query from a client and consulting at least one of a client record in a client record database that stores information about the client and a flow record in a flow record database that stores information about the flow, wherein the information about the flow includes information about one or more previous DNS queries and or responses in a flow to which the DNS query is assigned. The method further includes formulating a response to the DNS query as a function of the information about the client and/or the information about the flow, wherein the DNS query includes a question, the response is intentionally defective or incomplete, and the response causes the client to be delayed in sending another DNS query as part of an attack. The method further includes updating at least one of the client record with information about the client and the flow record with information about the DNS query and the response as formulated and transmitting the response as formulated to the client.

In one or more embodiments, the response can be well-formed other than a defect, wherein the defect can include a slight malformation of the response that causes the response to be non-compliant with a protocol specification.

In one or more embodiments, the malformation intentionally can include at least one of an invalid combination of flags, an invalid ID field, a mismatched QNAME in the response, and/or omission of an answer to the DNS query.

In one or more embodiments, each malformation can be selected and/or applied using a randomizing function.

In one or more embodiments, the DNS query can request an address for a name and formulating the response includes intentionally including a new canonical name (CNAME) in the response, and updating the client record and/or the flow record can further use information about the CNAME and/or the new CNAME.

In one or more embodiments, the method can further include selecting a CNAME chain depth and querying the client record for the client that sent the DNS query, for each subsequent request from a client that is sent a DNS query for a previous CNAME response, responding with another new CNAME for a number of times until exceeding the chain depth, and incrementing the current chain depth in the client record, wherein updating the client record and/or the flow record further uses information about the selected chain depth.

In one or more embodiments, the DNS query can request an address for a name, and the method can further include selecting a black holed canonical name (CNAME) or a black holed name server, and formulating the response can include intentionally including the black holed CNAME or an address for the black holed name server in the response.

In one or more embodiments, the method can include analyzing observed behavior of the client, including analyzing the client record and/or the flow record and analyzing the subsequent DNS queries or lack of DNS queries by the client subsequent to the one or more transmitted responses, and formulating a new response to one of the subsequent one or more transmitted DNS queries that is likely to cause the client to continue outputting DNS queries based on the analysis of that client observed behavior.

In one or more embodiments, when the analysis reveals that the client does not continue outputting the subsequent DNS queries upon receiving the formulated new response, a field in client record and/or the flow record can be set to indicate that future DNS queries from the client should be dropped without a response.

In accordance with further aspects of the disclosure, a computer system is provided that performs the disclosed method. In accordance with still further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
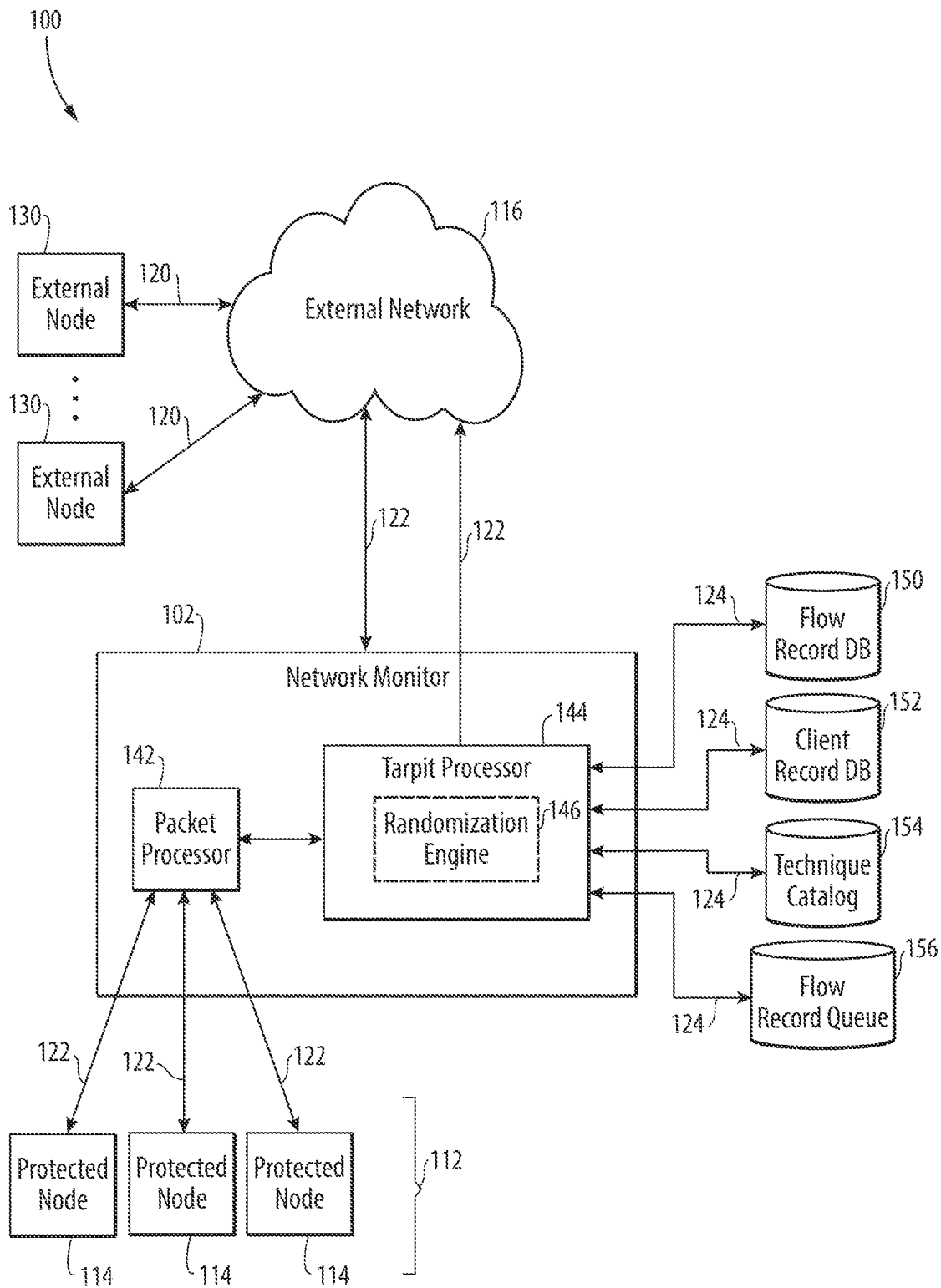
FIG. 1 illustrates a block diagram of an example network system having a network monitor with a tarpit processor, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with slowing requests from malicious network clients during network communication associated with a protected network of the network system 100 in accordance with the disclosure, or aspects thereof, are provided in FIGS. 2-9, as will be described.

With reference now to FIG. 1, network system 100 includes a network monitor 102 that detects and mitigates attacks directed at a target in one or more protected networks 112, each protected network having one or more protected nodes 114. External nodes 130 can communicate with protected nodes 114 via an external network 116. Communication between one of the protected nodes 114 and one of the external nodes 130 can be in accordance with a client/server model, in which one of the protected node 114 and the external node 130 functions as a client that requests a service, and the other of the protected node 114 and the external node 130 functions as a server that responds to the client for providing the requested service.

Network monitor 102 monitors network traffic to and from protected nodes 114 of the one or more protected networks 112, such as for analyzing request traffic output by external nodes 130 to protected nodes 114. The network monitor 102 includes or accesses a packet processor 142, a tarpit processor 144, a flow record database (DB) 150, a client record DB 152, a technique catalog 154, and a flow record queue 156.

Packet processor 142 is configured to process packets from external nodes 130, such as for detecting whether the packets are included in an application attack. When the packets are determined to be not included in an attack, the packet processor forwards the packets to protected network 112. However, when the packets are determined to be included in an attack, the packet processor forwards the packets to tarpit processor 144. The external node 130, also referred to as a DNS client ("client") that is a source of the packet determined to be included in the attack is referred to below as an attacker.

The objective of tarpit processor 144 is to leverage predictable behavior by the attacker in response to network failure or slowness by simulating network failure or slowness. When network failure or slowness is simulated, this can appear to the attacker as if the attack is working. The attacker can interpret the simulated network failure or slowness as failure by the target that was caused by the attack. Tarpitting techniques are used to simulate the network failure or slowness. These tarpitting techniques have a secondary effect of slowing down a rate of requests by the attacker. Further objectives include preventing the attacker from being able to resolve an IP address of its ultimate target(s), wherein the ultimate target is the computer handling the resolved IP address; and preventing the attacker from having the ability to flood a DNS server of a protected node 114 by redirecting the attacker in a way that causes the attacker to waste time without wasting any of the target server's or network's resources. For example, if it has been determined that the DNS request is from the attacker, the response to the DNS request can be an IP address controlled by the tarpit processor 144 instead of the IP address that would normally be resolved. In another example, the response can include tarpitting errors.

Most application-layer protocols (e.g. hypertext transfer protocol (HTTP), session initiation protocol (SIP)) rely on domain name system (DNS) servers to convert human-friendly hostnames (e.g., www.example.com) into machine-friendly internet protocol (IP) addresses (e.g., 198.51.100.42). If an attacker wants to target a webserver serving a website the attacker is likely to perform a DNS request to get the IP address.

Based on this reliance of application-layer protocols on DNS, tarpit processor 144 uses one or more tarpitting strategies. The tarpitting strategies can be used individually, combined, and/or parameters can be adjusted. Tarpit processor 144 can optionally (as indicated by the dashed line) include or access a randomization engine 146 that can randomize selection of tarpitting strategies and/or which parameters are adjusted or the settings to which the parameters are adjusted.

For each connection, tarpit processor 144 creates a flow record. Each connection identifies a connection between a source (meaning a client) and a destination, e.g., the 5-tuple (source IP address of the client, destination IP address, layer 4 protocol, source port of the client, destination port), that is tarpitted by tarpit processor 144. All of the flow records are stored in a data structure, such as flow record DB 150.

One tarpitting technique causes transmission delays. Each flow record is provided with a timestamp field that is used to introduce a transmission delays, flow records contain an additional field that has a timestamp indicating when another packet should be sent as a response to the external node 130. Pointers to flow records that have this timestamp set are sorted by the timestamp and saved in flow record queue 156. A flow record can have multiple timestamps for staggering transmission of the same packet at multiple different times, such that multiple pointers for the same flow record can be added to flow record queue 156. A timer signal fires periodically, which triggers the tarpit processor 144 to check flow record queue 156. Any flow records having a timestamp equal to the current time or older are processed and removed from flow record queue 156 for transmission to external nodes 130.

With reference to architecture of network monitor 102 and its related storage, network monitor 102 includes a central processing unit (CPU), random access memory (RAM), and a storage medium, which can be connected through buses and used to further support the processing of the received packets, as shown and described with respect to FIG. 12. Programmable instructions can be stored in the storage medium and executed by the CPU to cause the CPU to perform operations described herein. Network monitor 102 can be implemented as physical or virtual devices. Whether implemented as physical or virtual device(s), network monitor 102 uses a local or remote hardware processing device that executes software instructions, which enables performance of the disclosed functions.

Each of packet processor 142 and tarpit processor 144 can be accessible by network monitor 102, and can be integrated with or external from network monitor 102. In addition, each of packet processor 142 and tarpit processor 144 can be implemented using software, hardware, and/or firmware. Packet processor 142 and tarpit processor 144 can be configured as different processes and/or as distinct computing devices, or packet processor 142 and tarpit processor 144 can be a single process or executed on a single computer. Functionality and/or components packet processor 142 and tarpit processor 144 can be shared or divided amongst packet processor 142 and tarpit processor 144 in a variety of ways.

Protected network 112 can include one or more networks, such as an intranet, a local area network (LAN), and/or a wide area network (WAN). In examples, protected network 112 can be an enterprise network, such as a school network, business network, and government network, to list a few examples, that can connect to the Internet. The external network 116 can include one or more WANs, e.g., the Internet, which may be used to access protected network 112.

In embodiments, at least portions of the network monitor 102 are located between the external network 116 and the protected network 112. In other embodiments, at least portions of the network monitor 102 are located within the external network 116 or protected network 112. At least portions of the network monitor 102 can be located at a network edge (inside or outside of the protected network 112) or deeper within the protected network 112.

In the example shown, one protected network 112 is shown, however one skilled in the art will recognize that the network monitor 102 can provide a protection service to multiple protected networks 112. Similarly, the number of protected nodes 114 per protected network is not limited to a particular number.

Packet processor 142 of network monitor 102 includes or communicates with hardware, firmware, and/or software components that are configured to observe content of packets included in network traffic. Packet processor 142 can include central or distributed elements for observing, intercepting, and/or analyzing network data. These elements can be passive or active and include software, firmware, and/or hardware components, such as taps, probes, or port mirrors. These elements can be positioned inline, and/or remote relative to communication links 120 and 122.

Each of protected nodes 114 and external nodes 130 can be a computing device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets. The protected nodes 114 and external nodes 130 can each operate as a client or as a server in a client/server exchange that uses a client-server protocol. The disclosure is directed to scenarios in which an external node 130 operates as a client and submits a request (such as a DNS request and/or request using a protocol, such as TCP, HTTP, internet control message protocol (ICMP), SIP, and/or user datagram protocol (UDP)) to a protected node 114 that is operating as a server.

Each of flow record DB 150, client record DB 152, technique catalog 154, and flow record queue 156 can store data structures used by network monitor 102. The data structures can be stored in memory or on persistent storage (such as a file system) that is integrated with network monitor 102, or in one or more database systems that are external to network monitor 102. For example, flow record DB 150, client record DB 152, technique catalog 154, and flow record queue 156 can be stored in one or more storage devices that includes computer system readable media in the form of volatile or non/volatile memory or storage media, such as random access memory (RAM), cache memory, a magnetic disk, an optical disk, etc. The storage device(s) can be accessible by network monitor 102, and can be integrated with or external from network monitor 102.

Network traffic can flow via communications links 120, 122, and 124. In the example shown, network traffic flows to and from external network 116 via wired and/or wireless communication links 120, network traffic flows between network monitor 102 and the protected nodes 114 of the protected network(s) 112 via wired and/or wireless communication links 122, and network traffic flows between tarpit processor 144 and the external network 116 via wired and/or wireless communication link 124.

With reference now to FIGS. 2-4, 7, and 8, shown are flowcharts and flow diagrams demonstrating implementation of the various exemplary embodiments. It is noted that the order of operations shown in FIGS. 2-4, 7, and 8 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the transfer of information is not meant to be limiting. For example, the term "receive" as used herein refers to obtaining, accessing, retrieving, reading, or getting a transmission. Use of any of these terms is not meant to exclude the other terms. Data that is transferred to or from a module can be transferred by a transmission to or from the module, or can include the data in a location that can be accessed by the module or is provided in a manner to be accessible to another module.

Figure 2:
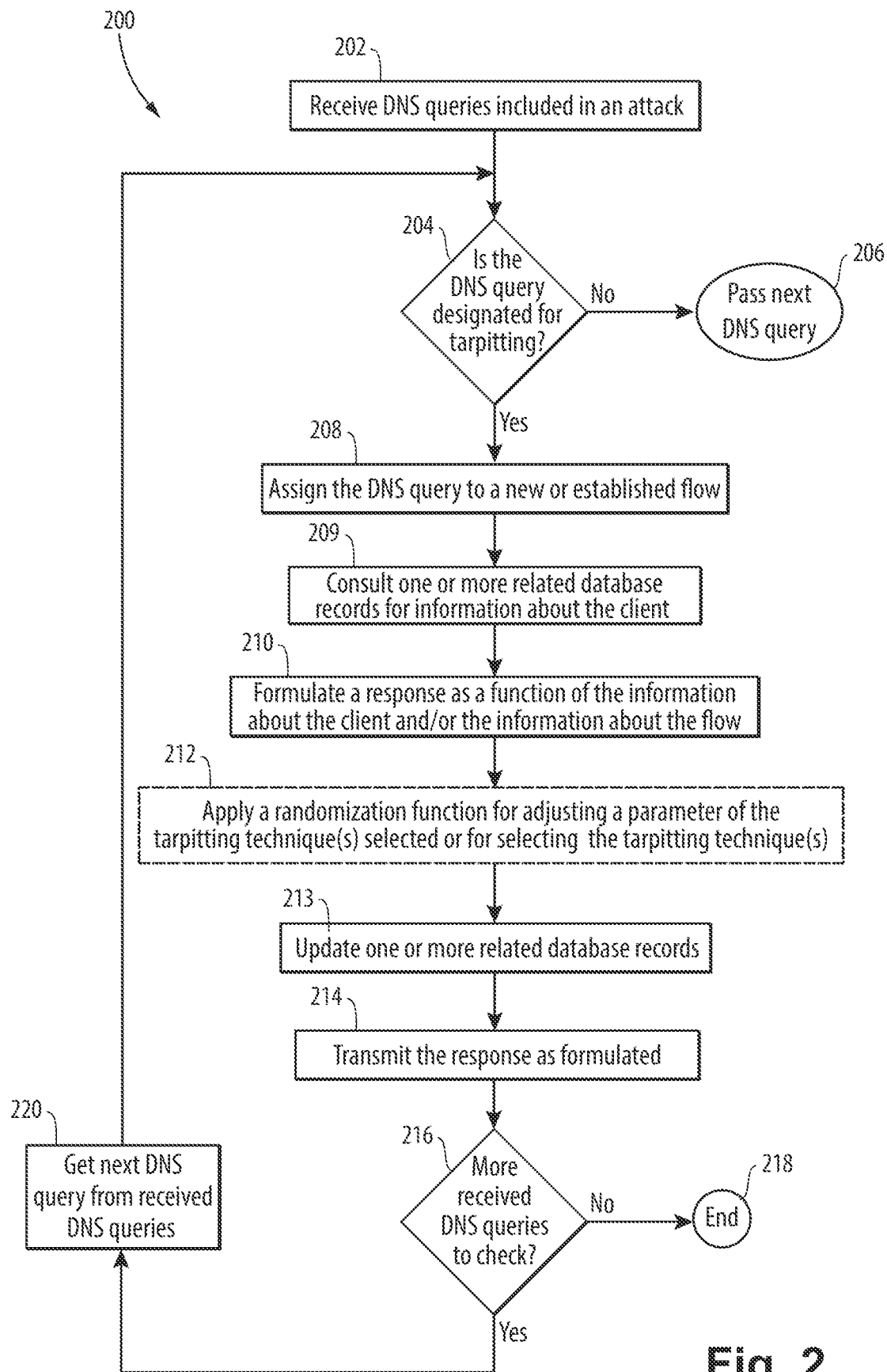
FIG. 2 illustrates a flowchart showing an example method of processing packets by the tarpit processor, in accordance with one or more embodiments of the disclosure.

FIG. 2 shows a flowchart 200 of example operations performed by a network monitor, such as packet processor 142 and/or tarpit processor 144 of network monitor 102 shown in FIG. 1, for processing packets. In the example shown, packet processor 142 handles blocks 202-206 and 216-220, and tarpit processor 144 handles blocks 208-214. However, it is understood that performance of blocks 202-220 can be divided among packet processor 142 and tarpit processor 144 in a variety of ways. At block 202, packets known to be included in an attack are received. These packets can be malicious DNS queries from a client that is mounting the attack. At decision block 204, a determination is made (e.g., considering the received DNS queries one at a time) whether the received DNS query is designated for tarpitting. This can be performed, for example, by checking the source IP address of the DNS query against a tarpit list. The tarpit list can be stored as a data structure in memory or persistent storage (such as a file system) of the network monitor or in a database system that is external to the network monitor. The tarpit list can be implemented, for example and without limitation, as a lookup table (LUT) or as an access control list (ACL) with an action for the source IP address set to tarpit (e.g., by the tarpit processor).

If the determination at block 204 is NO, meaning the DNS query's source IP address is not included on the tarpit list, then the method continues at block 206, at which the DNS query is passed to a protected network being protected by the network monitor, such as protected network 112 shown in FIG. 1. If the determination at block 204 is YES, meaning the DNS query's source IP address is included on the tarpit list, then the method continues at block 208, at which the DNS query is processed by the tarpit processor.

At block 208, the tarpit processor consults a collection of flow records (e.g., a database), such as flow record DB 150 shown in FIG. 1, and a determination is made whether a flow record exists for the DNS query. The flow records in the flow record DB can be identified by source and destination IP addresses and port addresses. If it is determined that the DNS query has source and destination IP addresses and port addresses that match a flow record in the flow record DB, the matching flow record is retrieved. If the there is no flow record in the flow record DB that matches the DNS query's source and destination IP addresses and port addresses, a flow record is created for the DNS query (with the source and destination IP addresses and ports of the DNS query) and added to the flow record DB.

The method then continues at block 209 for consulting one or more related data base records. The database records can include, for example, a client record for the client stored in a client record database, such as client record database 152 shown in FIG. 1. If a client record corresponding to the DNS query's source IP exists in a database, it can indicate whether the client is known to handle (or not handle) a DNS truncate response or DNS CNAME chaining, or other information about the client.

The method then continues at block 210 for processing the flow assigned to the flow record that was retrieved or created. At block 210, at least one tarpitting technique is selected to apply to the flow. The tarpitting technique can include responding to the malicious request with a response that is formulated to cause the client to slow down its attack of malicious requests. For example, the response can be intentionally defective or incomplete, wherein the malicious request includes a DNS query. The defective or incomplete response can cause the client to be delayed in sending another DNS query as part of an attack. The response is formulated as a function of the information about the client and/or the information about the flow. For example, if the client record indicates that the client has been observed to retry after two seconds, then the response should not be delayed for more than two seconds. As another example, if the flow record indicates that this flow has reached the maximum CNAME chain depth 516, then an additional CNAME redirection will not be formulated.

At block 212 (which is optional, as indicated by the dashed lines), a randomization function is applied for either adjusting a parameter of the selected tarpitting technique, or for selecting the tarpitting technique in block 210. Blocks 212 and 210 can be combined and/or performed in reverse order.

At block 213, one or more database records are updated. The database records can include, for example, the client record and/or the flow record. At block 214, the response as formulated is transmitted to the client.

At decision block 216, a determination is made whether there are additional received DNS queries to check. If the determination at decision block 216 is YES, meaning that there are more received DNS queries to check, the method continues at block 220 for retrieving a next DNS query of the received DNS queries. If the determination at decision block 216 is NO, meaning that there are no further received DNS queries to check, the method ends at block 218.

Thus, as future DNS queries are received, information about the client and/or the flow that was previously updated is used to formulate the responses to the future DNS queries.

Figure 3:
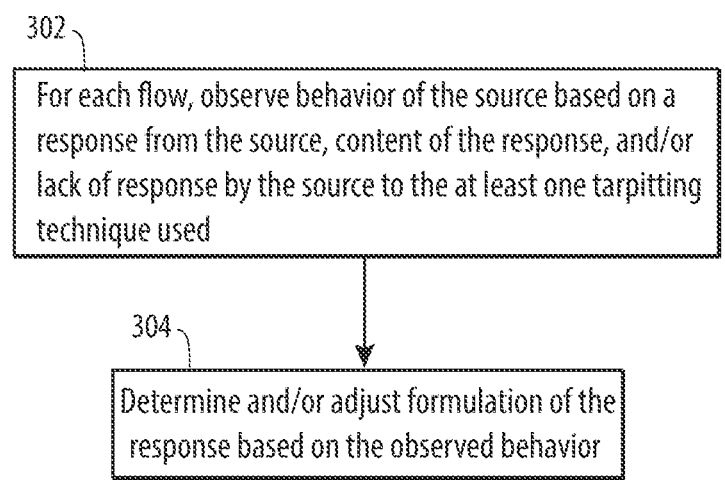
FIG. 3 illustrates a flowchart showing a further example method of processing packets by the tarpit processor, in accordance with one or more embodiments of the disclosure.

FIG. 3 shows a flowchart 300 of example operations that can be performed by a tarpit processor, such as tarpit processor 144 shown in FIG. 1, in accordance with one or more embodiments of the disclosure. At block 302, for each flow, behavior of the client is observed based on how the client responds to the replies sent to the client when implementing the selected tarpitting technique(s). The behavior observed can include responses from the client (e.g., timing and quantity of these responses) to the replies sent to the client when implementing the selected tarpitting technique(s), content of the response(s) from the client, and/or lack of response by the client. At block 304, formulation of the response is determined or adjusted based on the observed behavior. For example, if a client has never been observed to handle a DNS truncate response with a TCP DNS request, then the tarpit processor 144 will not select a tarpitting technique that involves sending a DNS truncate response. As another example, if a client has been observed to send a very high rate of DNS queries without responding to any attempted delays by various tarpit techniques, then the client can be marked so that no DNS queries from that client are designated for tarpitting, and the network monitor will be instructed to deal with the attack conventionally.

Figure 4:
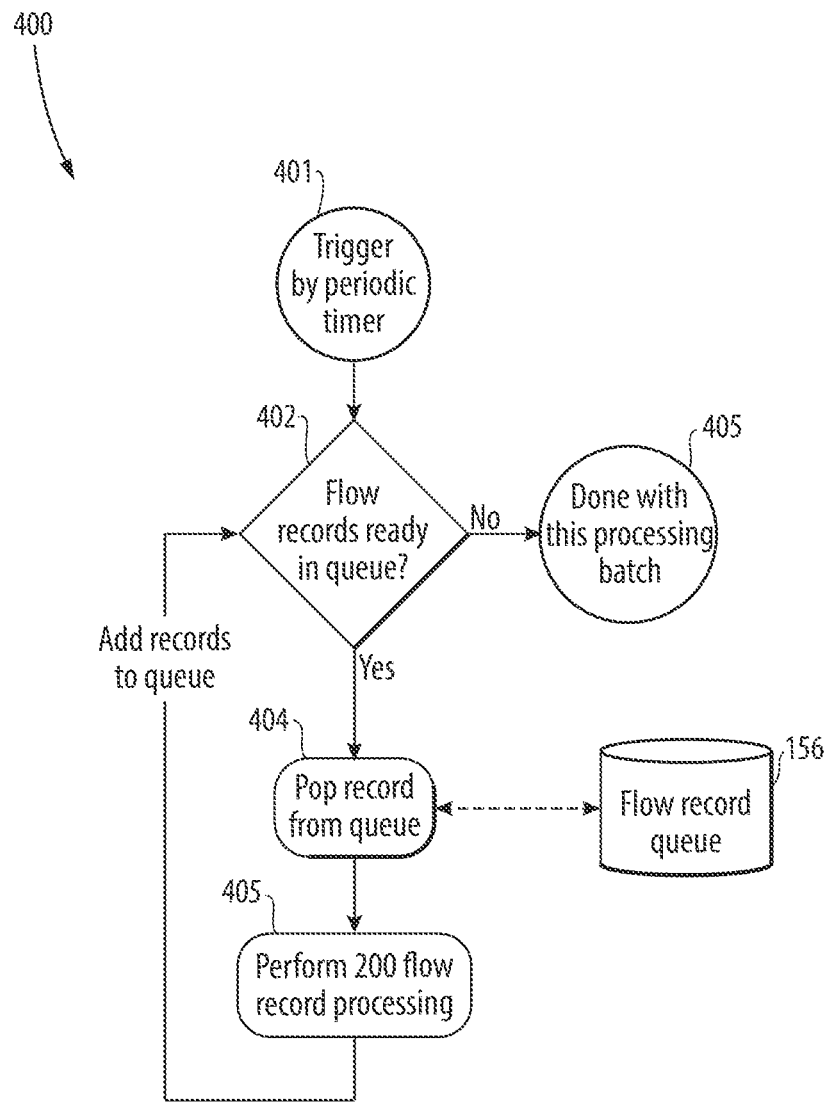
FIG. 4 illustrates a flowchart showing an example method of queue processing, in accordance with one or more embodiments of the disclosure.

FIG. 4 shows a flowchart 400 of example operations performed by a tarpit processor, such as tarpit processor 144 of network monitor 102 shown in FIG. 1, for processing DNS queries. At block 401, the initiation of the method is triggered periodically by a periodic timer. At block decision 402, a determination is made whether any flow records are ready in a flow record queue, such as flow record queue 156 shown in FIG. 1. A flow record is considered to be ready when it has a timestamp equal to or older than the current time. If the determination at block 402 is NO, meaning there are no flow records ready in the flow record queue, then the method of processing the flow record queue ends at block 405. If the determination at block 402 is YES, meaning there are flow records ready in the flow record queue, then the method continues at block 404. At block 404, the flow record is popped from the flow record queue. Next, block 405 performs steps 208-214 which are shown and described in greater detail with respect to FIG. 2.

A loop of blocks 402, 404, and 405 are repeated until there are no further flow records ready in the flow record queue to be processed. It is noted that the flow record queue can be modified during performance of block 405, such as by adding the same record to the flow record queue for replacing the flow record as it was previously stored on the flow record queue with a later time stamp (e.g., for delaying a transmission of the corresponding DNS query) or for adding an additional instance of the flow record on the flow record queue (e.g., for multiple staggered transmissions of the corresponding DNS query).

Figure 5:
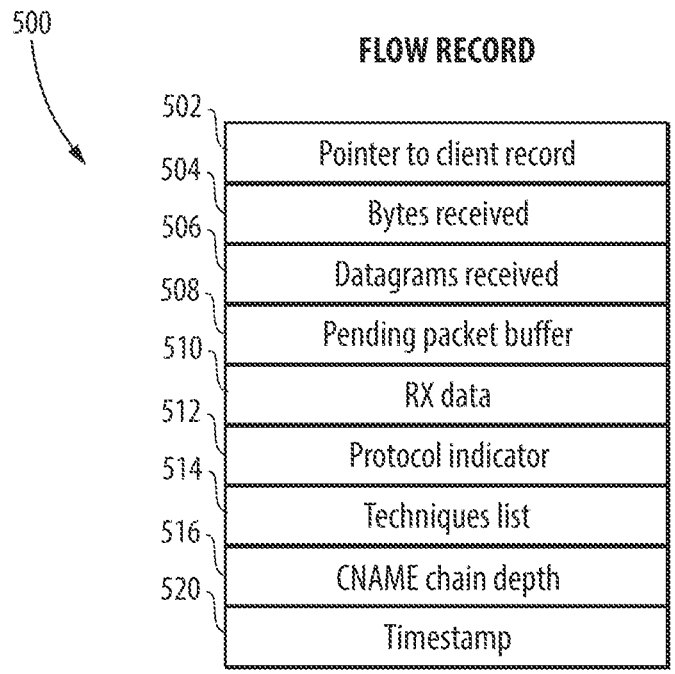
FIG. 5 illustrates an example flow record, in accordance with one or more embodiments of the disclosure.

FIG. 5 shows an example flow record 500 for a particular flow, wherein each flow has an associated flow record. The flow record 500 includes a number of fields, including: a pointer to client record field 502, a bytes received field 504, a datagrams received field 506 (which can be used for UDP applications and can be omitted for non-UDP applications), a pending packet buffer 508, an RX data field 510, a protocol indicator 512, a techniques list 514, a CNAME chain depth field 516 (which can be used for applications that use CNAME and can be omitted for applications that do not use CNAME), and a timestamp field 520.

Pointer to client record 502 stores a pointer that points to a client record 600 stored to include data about the external node 130 (which is the client and is shown in FIG. 1) that was a source of the DNS queries received that belong to the flow record 500. Pending packet buffer 508 stores data that tarpit processor 144 is in the process of sending to a connection, for example as described above with reference to state 522. RX data field 510 stores data received about a connection, for example a DNS request.

Protocol indicator 512 includes a protocol used by the associated flow. Techniques list 514 stores a list of candidate tarpitting techniques that were selected from technique catalogue 154 (shown in FIG. 1). The candidate tarpitting techniques included in techniques list 514 are selected based on the protocol identified by protocol indicator 512 and a protocol mask or the equivalent associated with each technique included in technique catalogue 154. Technique catalogue 154 stores multiple tarpitting techniques, wherein each of the stored tarpitting techniques have a protocol mask indicative of one or more protocols to which the tarpitting technique is suitable to be applied. The candidate tarpitting techniques selected from technique catalogue 154 each have a protocol mask that matches the protocol indicator 512 of the flow record. When one or more tarpitting techniques are selected for implementation, they are selected from the candidate tarpitting techniques. In one or more embodiments, selection of the tarpitting technique(s) to be implemented can be randomized by using a randomization function.

CNAME chain depth field 516 indicates a chain depth for providing canonical names (CNAMEs) or redirections for the flow is used. This parameter can be preset or can be randomized using a randomization function.

Figure 6:
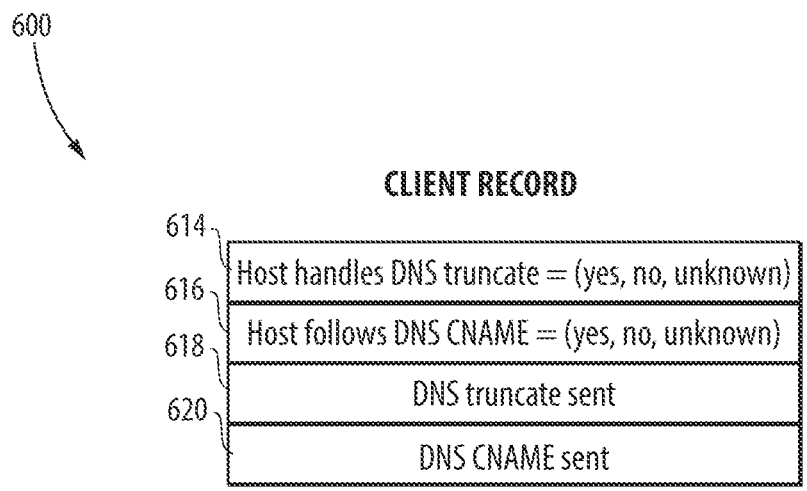
FIG. 6 illustrates an example client record, in accordance with one or more embodiments of the disclosure.

With reference to FIG. 6, an example client record 600 is shown for a client that is an external node 130 (shown in FIG. 1) that has transmitted a request subjected to tarpitting by the tarpit processor 144 (shown in FIG. 1). Generally, client record 600 is used by network monitor 102 to store information gleaned about a client. The client record 600 includes a number of fields, including a total bytes received field 604 that indicates the total number of bytes sent by the client; the description of FIG. 3 provides examples of usage of this field. Datagrams received field 608 indicates the total number of datagrams sent by the client; the description of FIG. 3 provides examples of usage of this field.

Client handles DNS truncate field 614 can hold the values of (yes, no, unknown) to track whether the client has responded properly to a DNS response that the system has sent with the "truncate" bit sent. In the DNS truncate sent field 618, network monitor 102 tracks how many responses have been sent with the truncate bit set, which allows it to later set client handles DNS truncate field 614 based on the subsequent behavior of the client. The DNS truncate sent field 618 is set to a value that is incremented when a DNS response is generated with the truncate bit set.

Client follows DNS CNAME field 616 can hold the values of (yes, no, unknown) to track whether the client has responded properly to a DNS response that the system has sent with a "CNAME" response. The DNS CNAME sent field 620 tracks how many responses have been sent with a CNAME, which allows it to later set client follows DNS CNAME field 616 based on the subsequent behavior of the client. The DNS CNAME sent field 620 is set to a value that is incremented when a DNS response is generated with a CNAME. The TCP minimum window size 622 controls the minimum TCP window size that a randomization function may select for TCP connections from the client.

Client techniques list 624 contains the list of tarpitting techniques that may be considered for flows to the client. This initially contains all techniques but may be restricted by certain analyses as explained below.

The fields shown for client record 600 are non-exhaustive, and shown for illustrative purposes only for illustrating some example functions performed. For example, if the client record 600 that was found has a client handles DNS truncate field 614 that is set to "yes", then a DNS response can be sent with a "truncate" bit set. If the client handles DNS truncate field 614 field is set to "unknown" and the DNS truncate sent field 618 is set to a value that is below a first threshold value, then a DNS response can be sent with the truncate bit set. If the DNS truncate sent field 618 is above a second threshold value (wherein the first and second thresholds can be same or can be different), then the client handles DNS truncate field 614 can be set to "no".

If a DNS response is generated with the truncate bit set, then client record's DNS truncate sent field 618 is incremented. An interval of time TI is selected in which to send a packet with the DNS response, wherein TI may be a preconfigured time interval or may be randomly selected in accordance with a randomization function. The associated flow record's timestamp 520 is set to be TI milliseconds in the future.

Listed now are some non-exhaustive example tarpitting techniques that can be selected for application to a received DNS query (e.g., that includes a malicious request) from a client, wherein the request belongs to a flow designated for tarpitting. Some example methods for applying a randomization function to the tarpitting techniques are also described.

In one or more embodiments, the response is well-formed other than a defect, wherein the defect includes a slight malformation of the response that causes the response to be non-compliant with a protocol specification.

In one or more embodiments, wherein the malformation intentionally includes at least one of an invalid combination of flags, an invalid ID field, a mismatched query name (referred to as QNAME) in the response, and/or omission of an answer to the DNS query. QNAME is a domain name represented as a sequence of labels.

In one or more embodiments, the tarpitting techniques can include responding to the received DNS query with a response that is delayed by a selected delay interval. The length of the delay can be selected using the randomization function. In one or more embodiments, the tarpitting techniques can include responding to the received DNS query with a selected error message. The error message can be selected from a plurality of candidate error messages using the randomization function.

In one or more embodiments, the tarpitting technique(s) can include, wherein when a received DNS query uses transmission control protocol (TCP), responding to the DNS query with numerous responses each having a small portion of the full response, responding to the received DNS query with a message having a bad TCP checksum, setting a TCP window size to a selected small value; and/or responding to the received DNS query with a message that does not include acknowledgement data. In addition to randomly selecting one of these tarpitting techniques, the division of the response into numerous responses and/or the small value can be selected using the randomization function.

In one nor more embodiments, the tarpitting technique(s) can include responding with a malformed response, such as by omitting or corrupting a selected portion of the response. The randomization function is used to determine at least one of which type of malformed response of a plurality of candidate types of malformed responses is used as the malformed response; which field(s) of a plurality of candidate fields in the malformed response to deform by e.g., changing, adding, or omitting data; which portion of the field determined to be malformed is to be deformed (e.g., offset from the start of the field and size); and how the randomization is applied to the field; a type of deformation to apply to the response; an amount of malformed responses to transmit; and a corrupted value to include in the malformed response.

For example, in one or more embodiments, the tarpitting technique(s) can include responding to the received DNS query with an invalid opcode. The value to set in the opcode field can be selected using the randomization function.

In one or more embodiments, the tarpitting technique(s) can include responding to the received DNS query with a delegation to a name server address that is null-routed, also known as having a "black hole route," meaning that any traffic sent to that address is silently dropped. When the client tries to query that address, it will not receive a response and will timeout.

In one or more embodiments, the tarpitting technique(s) can include responding to the received DNS query with a CNAME, where the name server for the CNAME is null-routed (meaning having a "black hole route"). When the client tries to query that CNAME, it will not receive a response and will timeout.

A chain depth for controlling a number of chained canonical names or redirections can be selected. The randomization function can optionally be used to select chain depth.

In one or more embodiments, the tarpitting technique(s) can include responding to the received DNS query with an answer including a CNAME, and including an additional "A" record with an address that is null-routed.

In one or more embodiments, the tarpitting technique(s) can include responding to the (original) received DNS query with an answer including a delegation or CNAME as described above, but without an "A" record, and instead only including a different name. When the client requests resolution of that name, the tarpit system responds with another delegation or CNAME that also contains no "A" record (e.g., that contains a host record), and only a different delegation or name (meaning a new delegation or CNAME). These responses, which emanate from the original received DNS query, may be "chained" together to an arbitrary length, creating a "delegation chain" or "CNAME chain". The client record and/or the flow record are updated using information about the CNAME and/or the new CNAME.

Behavior of a client can be tracked using the flow record 500 and/or the client record 600 for determining whether the client is compliant with specification of a protocol being used. For example and without limitation, some behaviors that can be useful to track include tracking whether: a DNS client fails to submit additional DNS queries in answer to the response, a DNS client follows a CNAME redirect, a DNS client transmits a TCP request following a "truncation" response, a DNS client performs retries in response to an error reply, a TCP client performs retries in response to an error reply, the maximum inter-packet delay that still elicits a response from a client. It should be noted that fields may be added to the client record 600 for tracking all of these and similar behaviors.

When it is determined by analyzing the client record associated with a particular client that the client is not taking the bait for a tarpitting trap, a change in strategy is warranted to avoid expending resources continuing to attempt to bait that client. The change can include formulating a new response to subsequent DNS queries from the client, discontinuing or changing the tarpitting techniques and/or adjusting application of the randomization function based on the observed behavior. For example, when analysis of the client record reveals that the client does not perform an additional query for a response that includes a DNS CNAME, the randomization function should not select this technique for tarpitting that client.

When formulating the new response, the new response can be formulated to cause the client to continue outputting DNS queries based on the analysis of that client observed behavior. When analysis of the client's behavior reveals that the client does not continue outputting the DNS queries upon receiving the formulated new response, a field in client record and/or the flow record is set to indicate that future DNS queries from the client should be dropped without a response.

If analysis of a client's past behavior reveals that the client does not follow a CNAME chain beyond a certain depth, then future CNAME chains for that client can be initialized to be below that depth.

Figure 7:
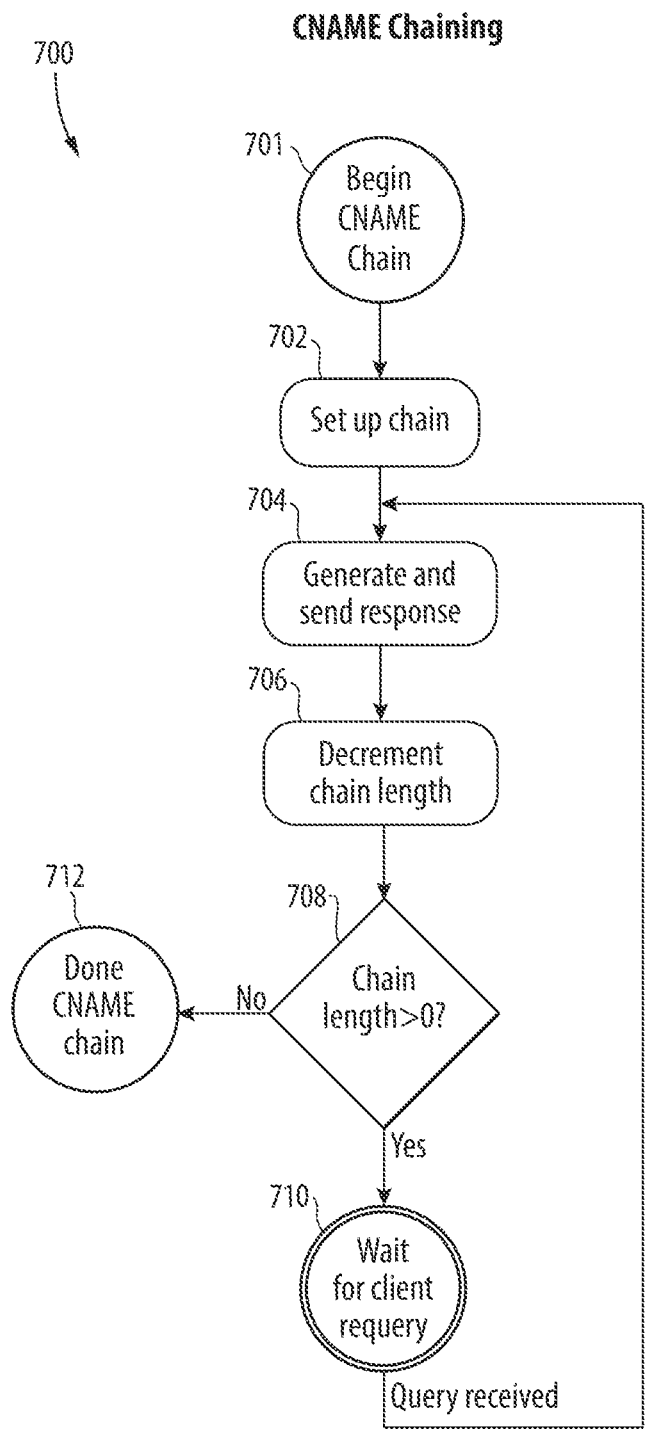
FIG. 7 illustrates a flowchart showing an example method of performing a tarpitting technique that uses CNAME chaining, in accordance with one or more embodiments of the disclosure.

FIG. 7 shows a flowchart 700 of example operations performed by an example tarpit processor, such as tarpit processor 144 of network monitor 102 shown in FIG. 1, for performing a tarpitting technique that uses CNAME chaining with a flow that has a protocol indicator 512 set to DNS. At block 701 a CNAME chain process is begun. At block 702 the chain is set up. The chain is set up with a selected chain length. The chain length can be selected by applying a randomization function.

At block 704 a response is generated and sent. At block 706 a length of the chain is decremented. At decision block 708 a determination is made whether the chain length is greater than zero. If the determination at block 708 is that NO, the chain length is not greater than zero (meaning the chain has been depleted), the method ends at block 712. If the determination at block 708 is that YES, the chain length is still greater than zero, the method continues at block 710 in which a wait state is entered until a client re-query is received, after which the method continues at block 702.

Figure 8:
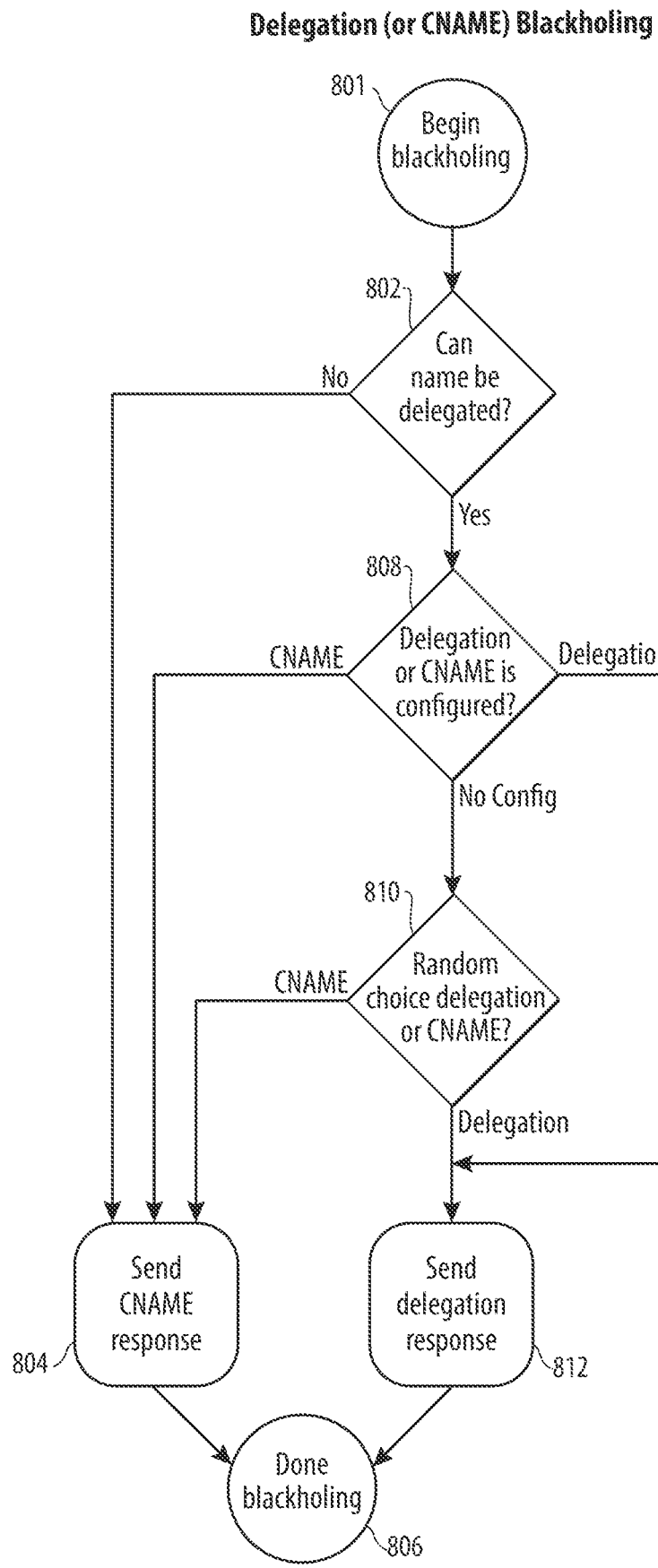
FIG. 8 illustrates a flowchart showing an example method of performing a tarpitting technique that uses delegation or CNAME blackholing in accordance with one or more embodiments of the disclosure.

FIG. 8 shows a flowchart 800 of example operations performed by an example tarpit processor, such as tarpit processor 144 of network monitor 82 shown in FIG. 1, for performing a tarpitting technique that uses that uses delegation or CNAME blackholing with a flow that has a protocol indicator 512 set to DNS. At block 801 a blackholing process is begun. At decision block 802, a determination is made whether the name contained in a received DNS query of the current flow can be delegated. If the determination at decision block 802 is that NO, the name cannot be delegated, the method continues at block 804. At block 804 a CNAME response is sent with the name that was accessed, followed by block 806, at which the method ends. If the determination at decision block 802 is that YES, the name can be delegated, the method continues at decision block 808. At decision block 808 a determination is made whether the delegation of CNAME is configured. If the determination at decision block 808 is that no configuration is provided, the method continues at random selection block 810.

At random selection block 810, a random function is applied to choose delegation or CNAME. If the determination at decision block 808 or the selection at random selection block 810 is CNAME, the method continues at block 804 for sending the CNAME response (after which the method ends at block 806). If the determination at decision block 808 or the selection at random selection block 810 is delegation, the method continues at block 812. At block 812 a delegation response is sent, after which the method ends at block 806.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of network monitor 102 (including packet processor 142 and tarpit processor 144) may be implemented or executed by one or more computer systems. For example, network monitor 102 can be implemented using a computer system such as example computer system 900 illustrated in FIG. 9. In various embodiments, computer system 900 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 900 is only one example of a suitable system and is not intended to suggest any limitation as to the scope of use or functionality of embodiments of the disclosure described herein. Regardless, computer system 900 is capable of being implemented and/or performing any of the functionality set forth hereinabove.

Computer system 900 may be described in the general context of computer system-executable instructions, such as program modules, being executed by a computer system. Generally, program modules may include routines, programs, objects having data and/or functions that can be invoked by data values, classes (wherein the objects (as an instance of a class) and classes form a virtual machine), virtual components, logic, data structures, and so on that perform particular tasks or implement particular abstract data types. Computer system 900 may be practiced in distributed data processing environments where tasks are performed by remote processing devices that are linked through a communications network. In a distributed data processing environment, program modules may be located in both local and remote computer system storage media including memory storage devices.

Figure 9:
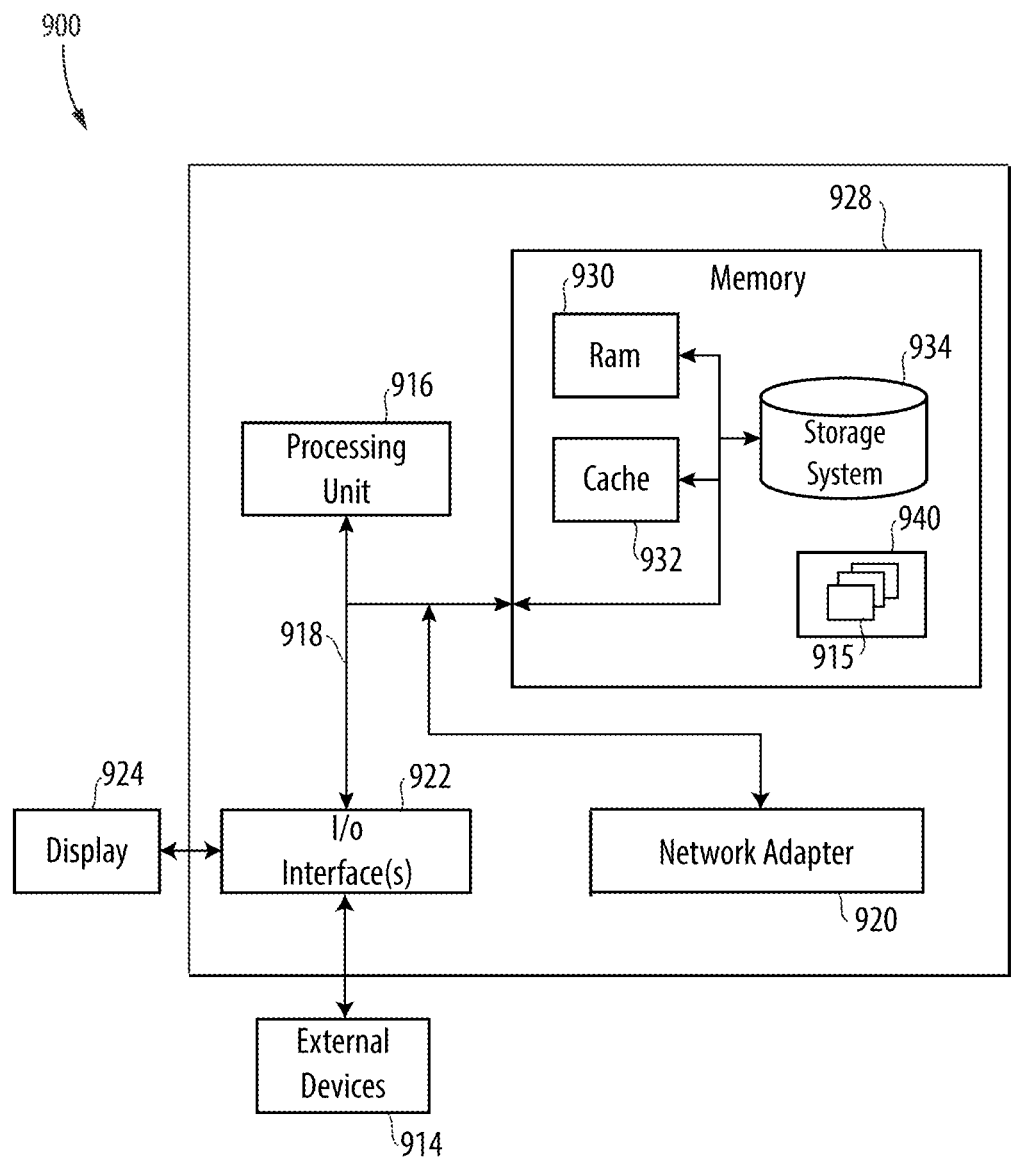
FIG. 9 illustrates an example computing system that could be used to implement a network monitor, as shown in FIG. 1, in accordance with an embodiment of the disclosure.

Computer system 900 is shown in FIG. 9 in the form of a general-purpose computing device. The components of computer system 900 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus or a virtual messaging link like MQ (Message Queuing)

Computer system 900 typically includes a variety of computer system readable media. Such media may be any available media that is accessible by network monitor 102, and it can include both volatile and non-volatile media, removable and non-removable media.

System memory 928 can include computer system readable media in the form of volatile memory, such as random access memory (RAM) 930 and/or cache memory 932. Computer system 900 may further include or access other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure. In embodiments, flow record DB 150, host record DB 152, technique catalog 154, and/or flow record queue 156 shown in FIG. 1 may be included in memory 928.

Program/utility 940, having a set (at least one) of program modules 915, such as packet processor 142 and tarpit processor 144, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the disclosure as described herein.

Computer system 900 may also communicate with one or more external devices 914 such as a keyboard, a pointing device, a display 924, external storage devices, etc.; one or more devices that enable a user to interact with computer system 900; and/or any devices (e.g., network card, modem, etc.) that enable computer system 900 to communicate with one or more other computing devices. Such communication can occur via Input/Output (I/O) interfaces 922. Still yet, computer system 900 can communicate with one or more networks such as a local area network (LAN), a general wide area network (WAN), and/or a public network (e.g., the Internet) via network adapter 920. As depicted, network adapter 920 communicates with the other components of computer system 900 via bus 918. It should be understood that although not shown, other hardware and/or software components could be used in conjunction with computer system 900. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by network monitor 102 include the ability to combine tarpitting techniques in order to make it harder for an attacker to realize that a defense mechanism is in place and/or to make it harder for the attacker to avoid countermeasures applied. An additional advantage is that the system can alternate between different techniques, both over time and for different attacker source IP addresses (of a client), which also presents the same challenges to an attacker. By keeping statistics for each client in the client record 600, the system can ensure that it is using the technique or techniques that are most effective against a particular attacker.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of delaying computer network clients from sending Domain Name System (DNS) queries, the method comprising:
   receiving a DNS query from a client;
   consulting at least one of a client record in a client record database that stores information about the client and a flow record in a flow record database that stores information about a flow, wherein the information about the flow includes information about one or more previous DNS queries and/or responses in a flow to which the DNS query is assigned;
   formulating a response to the DNS query as a function of the information about the client and/or the information about the flow, wherein the DNS query includes a question, the response is intentionally defective or incomplete, and the response causes the client to be delayed in sending another DNS query as part of an attack;
   updating at least one of the client record with information about the client and the flow record with information about the DNS query and the response as formulated;
   transmitting the response as formulated to the client;

analyzing observed behavior of the client, including analyzing the client record and/or the flow record and analyzing subsequent DNS queries or lack of DNS queries by the client subsequent to one or more transmitted responses; and formulating a new response to one of the subsequent DNS queries that is likely to cause the client to continue outputting DNS queries based on the analysis of the observed behavior of the client, wherein when the analysis reveals that the client does not continue outputting the subsequent DNS queries upon receiving the formulated new response, a field in client record and/or the flow record is set to indicate that future DNS queries from the client are to be dropped without a response.

2. The method of claim 1, wherein the response is well-formed other than a defect, wherein the defect includes a slight malformation of the response that causes the response to be non-compliant with a protocol specification.

3. The method of claim 2, wherein the malformation intentionally includes at least one of an invalid combination of flags, an invalid identification (ID) field, a mismatched Query Name (QNAME) in the response, and/or omission of an answer to the DNS query.

4. The method of claim 2, wherein each malformation is selected and/or applied using a randomizing function.

5. The method of claim 1, wherein,
the DNS query requests an address for a name,
formulating the response includes intentionally including a new canonical name (CNAME) in the response, and
updating the client record and/or the flow record further uses information about the new CNAME.

6. The method of claim 5, further comprising:
selecting a canonical name (CNAME) chain depth;
querying the client record for the client that sent the DNS query;
for each subsequent request from a client that is sent a DNS query for a previous CNAME response, responding with another new CNAME for a number of times until exceeding the chain depth; and
incrementing the current chain depth in the client record, wherein updating the client record and/or the flow record further uses information about the selected chain depth.

7. The method of claim 1, wherein,
the DNS query requests an address for a name,
the method further comprises selecting a black holed canonical name (CNAME) or a black holed name server, and
formulating the response includes intentionally including the black holed CNAME or an address for the black holed name server in the response.

8. A network monitor for monitoring a network during a distributed denial of service (DDOS) attack, the network monitor comprising:
a memory configured to store instructions;
at least one processing device in communication with the memory, wherein the at least one processing device upon execution of the instructions is configured to:
receive a Domain Name System (DNS) query from a client;
consult at least one of a client record in a client record database that stores information about the client and a flow record in a flow record database that stores information about a flow, wherein the information about the flow includes information about one or more previous DNS queries and or responses in a flow to which the DNS query is assigned;

formulate a response to the DNS query as a function of the information about the client and/or the information about the flow, wherein the DNS query includes a question, the response is intentionally defective or incomplete, and the response causes the client to be delayed in sending another DNS query as part of an attack;

update at least one of the client record with information about the client and the flow record with information about the DNS query and the response as formulated;

transmit the response as formulated to the client;

analyze observed behavior of the client, including analyzing the client record and/or the flow record and analyzing subsequent DNS queries or lack of DNS queries by the client subsequent to one or more transmitted responses; and formulate a new response to one of the subsequent DNS queries that is likely to cause the client to continue outputting DNS queries based on the analysis of the observed behavior of the client, wherein when the analysis reveals that the client does not continue outputting the subsequent DNS queries upon receiving the formulated new response, a field in client record and/or the flow record is set to indicate that future DNS queries from the client are to be dropped without a response.

9. The network monitor of claim 8, wherein the response is well-formed other than a defect, wherein the defect includes a slight malformation of the response that causes the response to be non-compliant with a protocol specification.

10. The network monitor of claim 9, wherein the malformation intentionally includes at least one of an invalid combination of flags, an invalid identification (ID) field, a mismatched Query Name (QNAME) in the response, and/or omission of an answer to the DNS query.

11. The network monitor of claim 9, wherein each malformation is selected and/or applied using a randomizing function.

12. The network monitor of claim 8, wherein the DNS query requests an address for a name and formulating the response includes intentionally including a new canonical name (CNAME) in the response, and updating the client record and/or the flow record further uses information about the the new CNAME.

13. The network monitor of claim 12, wherein the at least one processing device upon execution of the instructions is further configured to:
select a canonical name (CNAME) chain depth;
query the client record for the client that sent the DNS query;
for each subsequent request from a client that is sent a DNS query for a previous CNAME response, respond with another new CNAME for a number of times until exceeding the chain depth; and
increment the current chain depth in the client record, wherein updating the client record and/or the flow record further uses information about the selected chain depth.

14. The network monitor of claim 8, wherein,
the DNS query requests an address for a name,
the at least one processing device upon execution of the instructions is further configured to select a black holed canonical name (CNAME) or a black holed name server, and formulating the response includes intentionally including the black holed CNAME or an address for the black holed name server in the response.

15. A non-transitory computer readable storage medium and one or more computer programs stored therein, the computer programs comprising instructions, which when executed by a computer system, cause the computer system to:
- receive a Domain Name System (DNS) query from a client;
- consult at least one of a client record in a client record database that stores information about the client and a flow record in a flow record database that stores information about the flow, wherein the information about a flow includes information about one or more previous DNS queries and or responses in a flow to which the DNS query is assigned;
- formulate a response to the DNS query as a function of the information about the client and/or the information about the flow, wherein the DNS query includes a question, the response is intentionally defective or incomplete, and the response causes the client to be delayed in sending another DNS query as part of an attack;
- update at least one of the client record with information about the client and the flow record with information about the DNS query and the response as formulated; and
- transmit the response as formulated to the client;
- analyze observed behavior of the client, including analyzing the client record and/or the flow record and analyzing subsequent DNS queries or lack of DNS queries by the client subsequent to one or more transmitted responses, and
- formulate a new response to one of the subsequent DNS queries that is likely to cause the client to continue outputting DNS queries based on the analysis of the observed behavior of the client,
  - wherein when the analysis reveals that the client does not continue outputting the subsequent DNS queries upon receiving the formulated new response, a field in client record and/or the flow record is set to indicate that future DNS queries from the client are to be dropped without a response.

16. The non-transitory computer readable storage medium of claim 15, wherein the response is well-formed other than a defect, wherein the defect includes a slight malformation of the response that causes the response to be non-compliant with a protocol specification.

* * * * *